US008397737B2

(12) United States Patent
Evans et al.

(10) Patent No.: US 8,397,737 B2
(45) Date of Patent: Mar. 19, 2013

(54) LINEARLY ADJUSTABLE DEVICE

(76) Inventors: Chad Arthur Evans, New South Wales (AU); Warren Phillip Drew, New South Wales (AU)

( * ) Notice: Subject to any disclaimer, the term of this patent is extended or adjusted under 35 U.S.C. 154(b) by 0 days.

(21) Appl. No.: 12/997,981

(22) PCT Filed: Jun. 16, 2009

(86) PCT No.: PCT/AU2009/000765
§ 371 (c)(1),
(2), (4) Date: Dec. 14, 2010

(87) PCT Pub. No.: WO2009/152563
PCT Pub. Date: Dec. 23, 2009

(65) Prior Publication Data
US 2011/0238187 A1    Sep. 29, 2011

(30) Foreign Application Priority Data

Jun. 16, 2008   (AU) .................................. 2008903052

(51) Int. Cl.
*A45B 3/12* (2006.01)
(52) U.S. Cl. ........... 135/65; 135/69; 135/75; 248/188.4; 248/188.5; 403/109.4
(58) Field of Classification Search ............. 135/65–66, 135/69–70, 75, 78, 80–81, 911; 623/27, 623/28, 38; 403/109.4, 109.7, 111, 374.2–374.3; 248/188.3–188.5
See application file for complete search history.

(56) References Cited

U.S. PATENT DOCUMENTS

| | | | | | |
|---|---|---|---|---|---|
| 1,652,110 | A | * | 12/1927 | Fullington | 135/69 |
| 2,630,128 | A | * | 3/1953 | Slater | 135/69 |
| 3,157,189 | A | * | 11/1964 | Farnham | 135/69 |
| 3,351,363 | A | * | 11/1967 | Downey et al. | 285/303 |
| 3,987,807 | A | | 10/1976 | Varnell | |
| 4,093,969 | A | | 6/1978 | Mayron, Jr. | |

(Continued)

FOREIGN PATENT DOCUMENTS

| | | |
|---|---|---|
| AU | 124080 S | 10/1994 |
| AU | 2005225115 A1 | 5/2007 |

(Continued)

OTHER PUBLICATIONS

PCT Search Report mailed on Jul. 13, 2009, PCT Written Opinion mailed on May 11, 2010, and PCT International Preliminary Report on Patentability mailed on Oct. 18, 2010 corresponding to the related PCT Patent Application No. AU2009/000765.

(Continued)

*Primary Examiner* — Winnie Yip
(74) *Attorney, Agent, or Firm* — Kilpatrick Townsend & Stockton LLP

(57) ABSTRACT

A linearly adjustable device comprising a main body including at least two body sections each having a longitudinal axis, and a linear actuator. The sections are operatively connected together for linear movement relative to one another in the axial direction. The linear actuator is operatively mounted to the main body for causing the relative axial movement between the body section. The linear actuator includes a drive and a power transmission mechanism operatively connected to the drive. The transmission mechanism includes an elongated threaded member operatively connected to one of the body sections and a cooperating threaded member operatively connected to another of the body sections such that relative rotation between the elongated threaded member and the cooperating threaded member causes relative movement of the body sections.

21 Claims, 3 Drawing Sheets

U.S. PATENT DOCUMENTS

| | | | |
|---|---|---|---|
| 4,127,343 A | 11/1978 | Potter | |
| 4,181,290 A | 1/1980 | Affolter | |
| 4,189,821 A | 2/1980 | Potter | |
| 4,221,363 A | 9/1980 | Jasper | |
| 4,258,735 A | 3/1981 | Meade | |
| 4,274,430 A | 6/1981 | Schaaf et al. | |
| 4,515,423 A | 5/1985 | Moore et al. | |
| 4,625,742 A | 12/1986 | Phillips | |
| 4,749,169 A | 6/1988 | Pickles | |
| 4,790,339 A | 12/1988 | Bennett | |
| 4,796,648 A | 1/1989 | Goulter | |
| 4,832,318 A * | 5/1989 | Wang | 267/120 |
| 4,884,730 A | 12/1989 | Carpenter | |
| 4,954,735 A | 9/1990 | Parsons | |
| D319,276 S | 8/1991 | Keeler | |
| 5,118,082 A | 6/1992 | Byun | |
| 5,136,889 A | 8/1992 | Hill et al. | |
| 5,197,501 A | 3/1993 | Ragatz | |
| 5,297,779 A | 3/1994 | Collins et al. | |
| 5,318,057 A | 6/1994 | Wallum | |
| 5,398,780 A | 3/1995 | Althof et al. | |
| 5,411,044 A * | 5/1995 | Andolfi | 135/66 |
| 5,495,867 A | 3/1996 | Block | |
| 5,582,196 A | 12/1996 | Hae et al. | |
| 5,593,239 A | 1/1997 | Sallee | |
| 5,622,082 A | 4/1997 | Machelski | |
| 5,755,245 A | 5/1998 | Van helvoort | |
| 5,800,016 A | 9/1998 | Allred | |
| 5,806,402 A | 9/1998 | Henry | |
| 5,871,025 A | 2/1999 | Richter | |
| 5,892,309 A | 4/1999 | Dreher | |
| 5,895,992 A | 4/1999 | Dreher | |
| 5,973,618 A | 10/1999 | Ellis | |
| D427,763 S | 7/2000 | Kikuchi et al. | |
| 6,257,733 B1 | 7/2001 | Cruz | |
| 6,575,656 B2 * | 6/2003 | Suh | 403/109.6 |
| D479,767 S | 9/2003 | Mudd | |
| 6,722,635 B2 | 4/2004 | Erickson | |
| 6,745,786 B1 | 6/2004 | Davis | |
| 6,772,653 B1 | 8/2004 | Franksson | |
| 6,782,903 B1 | 8/2004 | Jarman et al. | |
| 6,820,854 B2 | 11/2004 | Oetiker | |
| 6,877,520 B2 | 4/2005 | Morris | |
| 6,880,416 B2 * | 4/2005 | Koch | 74/89.35 |
| 6,997,362 B1 | 2/2006 | Pidcock | |
| D517,795 S | 3/2006 | Mival | |
| D518,630 S | 4/2006 | Mival | |
| 7,043,364 B2 | 5/2006 | Scherzinger | |
| 7,047,990 B2 | 5/2006 | Zambrano et al. | |
| 7,087,002 B2 | 8/2006 | Montgomery | |
| D531,399 S | 11/2006 | Olerud | |
| D540,534 S | 4/2007 | Chan | |
| 7,219,679 B2 | 5/2007 | Hsu et al. | |
| 7,234,757 B2 * | 6/2007 | Mitchell | 296/146.8 |
| 7,311,111 B2 | 12/2007 | Stanec | |
| 7,516,988 B2 * | 4/2009 | Lin | 285/7 |
| 7,562,626 B2 * | 7/2009 | Chan | 135/20.3 |
| 7,628,369 B2 * | 12/2009 | Chen | 248/354.3 |
| 2002/0189657 A1 | 12/2002 | Yuan | |
| 2004/0020524 A1 | 2/2004 | McConnell | |
| 2004/0107982 A1 | 6/2004 | Morris | |
| 2004/0250845 A1 | 12/2004 | Rudin et al. | |
| 2004/0255995 A1 | 12/2004 | Garrett | |
| 2004/0263345 A1 | 12/2004 | Gladys | |
| 2005/0055977 A1 | 3/2005 | Kawakami | |
| 2005/0103373 A1 | 5/2005 | Heiss et al. | |
| 2006/0090783 A1 | 5/2006 | King-fai | |
| 2006/0254633 A1 | 11/2006 | Willis | |
| 2007/0023072 A1 | 2/2007 | Agnello | |
| 2007/0107760 A1 | 5/2007 | Reeves | |
| 2007/0151587 A1 | 7/2007 | Yu | |
| 2007/0251559 A1 | 11/2007 | Yu | |
| 2007/0252375 A1 | 11/2007 | Roiser | |
| 2007/0277863 A1 | 12/2007 | Gordon | |
| 2008/0012286 A1 | 1/2008 | Lenhart | |
| 2008/0035193 A1 | 2/2008 | Baker | |

FOREIGN PATENT DOCUMENTS

| | | | |
|---|---|---|---|
| DE | 4137466 A1 * | 5/1993 | |
| DE | 20219447 U1 | 5/2003 | |
| DE | 202004011241 U1 | 1/2005 | |
| DE | 202004013099 U1 | 1/2005 | |
| DE | 202004017640 U1 | 3/2005 | |
| EP | 0 542 395 A1 | 5/1993 | |
| EP | 541935 A2 * | 5/1993 | |
| EP | 1 777 421 A1 | 4/2007 | |
| EP | 1 524 455 A3 | 8/2007 | |
| FR | 2657522 A1 * | 8/1991 | |
| JP | 2006087534 A | 4/2006 | |
| WO | WO/03/090661 | 11/2003 | |
| WO | WO/2005/053569 | 6/2005 | |
| WO | WO 2006032162 A1 * | 3/2006 | |
| WO | WO/2006/042458 | 4/2006 | |

OTHER PUBLICATIONS

Designing motion control system with electronic cylinders (retrived from http://www.designfax.net/archives/0400/0400xf.asp)—May 5, 2008.

Electronic cylinder models (retrieved from http://www.nookindustries.com/cylinder/CylinderModels.cfm)—May 3, 2008.

Electro-thrust electric cyclinder ET (retrieved from http://divapps.parker.com/divapps/eme/EME/Literature_List/Dokumentationen/192_550011_ET_catalog_engl.pdf).

Maxon Gear (retrieved from http://maxonmotor.com.au/maxon_gear_ch_eng.html)—May 2008.

ACME & Lead Screw Assembly Glossary (retrieved from http://www.nookindustries.com/acme/AcmeGlossary.cfm)—May 3, 2008.

Hobby fever GTR shock-revo (retrieved from http://www.hobbyfever.com/product_info.php?cPath=1_17&products_id=3807)—May 6, 2008.

Hobby fever GTR shock; jato (retrieved from http://hobbyfever.com/product_info.php?cPath=1_17&products_id-4742)—May 6, 2008.

Hobby Fever—New shock body 1.02 (retrieved from http://www.hobbyfever.com/product_info.php?cPah=1_17&products_id=770)—May 6, 2008.

Hobby Fever—CVA short shock unit (retrieved from http://www.hobbyfever.com/product_info.php?cPath=1_17&products_id=6063)—May 6, 2008.

Hobby Fever—Aluminum Dampener (retrieved from http://www.hobbyfever.com/product_info.php?cPath=1_17&products_id=3865)—May 6, 2008.

Hobby Fever—Alum shck caps blue MGT (retrieved from http://www.hobbyfever.com/product_info.php?cPath=1_17&products_id=2990)—May 6, 2008.

Hobby Fever—Hrd Ctd thread shock bodies revo (retrieved from http://www.hobbyfever.com/product_info.php?cPath=1_17&products_id=4181)—May 6, 2008.

Suspension kits research guide (retrieved from http://www.autoanything.com/suspension-systems/50A26A163A4.aspx)—May 6, 2008.

Elastomers Queensland (retrieved from http://www.elastomers.com.au/gallery/html)—May 6, 2008.

Nitrorcx—Aluminum shock absorbers (retrieved from http://www.nitrocrx.com/51c00-06038.html) May 6, 2008.

Hobby Fever—GTR shock rebuild kit jato (retrieved from http://www.hobbyfever.com/product_info.php?cPath=1_17&products_id=4829)—May 6, 2008.

Hobby Fever—Kyosho Oil shock set low mount mini (retrieved from http://www.hobbyfever.com/product_info.php?cPath=1_17&products_id=231)—May 6, 2008.

Hobby Fever—shock boots (retrieved from http://www.hobbyfever.com/product_info.php?cPath=1_17&products_id=4936)—May 6, 2008.

Hobby Fever—spring shock GTR (retrieved from http://www.hobbyfever.com/product_info.php?cPath=1_17&products_id=3754)—May 6, 2008.

Pitpro racing products (retrieved from http://www.pitpro.ocm.au/browse.php?action=view_category&categoryID=32)—May 6, 2008.

Opposite lock—touch dog foam cell shock abs (retrieved from http://toughdogdealer.com.au/foamcell.htm)—May 6, 2008.

AutoAnything—suspension kits (retrieved from http://www.autoanything.com/suspension-systems/50A26A163A4.asp)—May 6, 2008.

ActionJac (Nook) retrieved from http://nook.texterity.com/nook/linearmotiondesignguide/)—May 6, 2008.

Electro-thrust electric cylinder ET, pub. Jun. 2008, (retrieved from http://divapps.parker.com/divapps/eme/EME/Literature_List/Dokumentationen/192_550011_ET_catalog_engl.pdf).

\* cited by examiner

LINEARLY ADJUSTABLE DEVICE

PRIORITY CLAIMS/RELATED APPLICATIONS

This application claims priority to PCT Application PCT/AU2009/000765, filed Jun. 16, 2009, which claims priority to Australian Application No. 2008903052, filed Jun. 16, 2008.

TECHNICAL FIELD

This invention relates to a device which is adapted for linear adjustment. The device can be used for the transmission of linear motion or power and can be used in a variety of applications as will be described in some detail later. In one particular application the device can be used as a walking aid.

SUMMARY OF THE DISCLOSURE

According to one aspect of the present invention there is provided a linearly adjustable device, the device comprising a main body including at least two body sections each having a longitudinal axis said sections being operatively connected together for linear movement relative to one another in the axial direction. The apparatus further comprises a linear actuator operatively mounted to the main body for causing the relative axial movement between the body sections. The linear actuator includes a drive and a power transmission mechanism operatively connected to the drive. The transmission mechanism includes an elongated threaded member operatively connected to one of the body sections and a cooperating threaded member operatively connected to another of the body sections such that relative rotation between the threaded members causes relative linear movement between the body sections.

In one form the body sections are operatively connected together in telescopic fashion. The body sections may be at least partly tubular in form and have a cross-section which may be circular, square or any other suitable shape. The body sections may be formed from any suitable material such as plastics, metal and the like. In one embodiment there are two body sections of tubular form, one having a larger internal cross-sectional dimension than the outer cross-sectional dimension of the other so that they can telescopically fit together and are slidably movable with respect to one another. The adjacent body sections may be operatively connected together by a coupling which may be in the form of a collar which may be fitted to an end of one of the body sections and through which the other body section can pass. One end of one of the body sections and the collar may have cooperating threaded portions which enable the collar to be fitted to the end of the body section. An internal split ring or split olive may be provided within the collar arranged such that when the collar is screwed on to the body section the split ring can tighten around the other body section thereby providing a lining or bush for the body section passing therethrough and also provide for a seal.

Means may be provided to inhibit relative rotation between the body sections. To this end, one or more longitudinally extending slots may be formed in the surface of one of the members. This may include a plurality of slots which are adapted to receive a detent means therein so that relative rotation between the members is inhibited. Each detent may be in the form of a ball moulded in a laterally extending aperture in the coupling ring or collar. Each ball may be urged into engagement with the associated slot by means of a bias element such as a spring. An aperture cap or grub screw may retain the spring in position.

The device may include a handle at one end of one of the body sections by which the device can be held. A compression spring or shock absorber may be disposed within the handle so as to provide some cushioned resistance between the handle and the main body. At the end of the body member remote from the handle an attachment may be coupled. In one specific, but non-limiting form, a rubber boot may be provided on the free end thereof. However, it will be appreciated that other attachments may be coupled for various other applications. The handle may be a hollow member which enables components of the device to be located therein. Access to the interior of the handle may be effected in any suitable manner. For example the handle may comprise two parts fitted together and held by suitable fastenings such as screws or the like. The handle may be formed from any suitable material such as for example, metal, plastics or wood. The handle may be of any suitable shape for example and may be generally tee-shaped.

The drive of the linear actuator may include a motor disposed within one of the body sections. A power source which may for example be in the form of a rechargeable battery is operatively connected to the motor and may be conveniently mounted within the handle. One or more actuator switches may be provided to activate the motor. In one form, a first switch may be provided to enable or disable power being provided to the device. In another form, another actuator switch may be provided which allows selection of the movement of the members. In another form, another actuator switch may be provided which allows for variable control of the speed of the movement of the members. In another embodiment, an actuator switch may be in the form of a three position toggled pressure switch including a first neutral position, a second position which causes rotation of the threaded member in one direction and a third position which causes rotation of the threaded member in the other direction. The switch may be pressure sensitive to control the power from the motor.

A connector which may be in the form of a pin socket may be provided in the handle for enabling the batteries to be connected to a battery charger.

The elongated threaded member of the transmission mechanism may be in the form of a rod which is operatively connected to the motor and disposed within the main body extending generally in the axial direction. The cooperating threaded member may comprise a block which is operatively connected to one of the body members and include a threaded aperture therein which is adapted to cooperate with the elongated threaded member so that rotation of the threaded member causes movement of the block therealong. In one example, the thread is of an acme type thread form which provides for high strength, a positive power transfer, and self locks under load which is advantageous. However, it will be appreciated that other thread arrangements are possible such as UNC thread, worm drive parallel threads and ball threads. It will be appreciated that these other forms of thread arrangements fail to self lock under load. A cooperating pin and elongated channel or groove may be provided in the body sections to inhibit relative rotation therebetween.

A clutch may be provided between the elongated threaded member and the drive motor. In addition a gear train may be provided if necessary. A coupling may be provided between the motor drive shaft and the elongated threaded member which is adapted to limit the torque transfer. In one arrangement the coupling may include a sleeve and spigot assembly with a shear pin arranged to shear under high loads. In another arrangement the coupling may include a ball-detent assembly which releases at high torque.

There may further be provided a stop at the end of the elongated threaded member to limit the relative linear movement between the two parts.

The handle may further include illuminating elements which may be in the form of LED lights or the like arranged to illuminate the region around the end of the main body remote from the handle. It will be appreciated that the LED lights are optional.

In another broad aspect there is provided a handle for use with a linearly adjustable device, the handle including a body having an aperture therethrough for defining a lateral member for allowing a user to grip the handle, the lateral member including an actuating switch extending therefrom and within the aperture for allowing a user to selectively control the linearly adjustable device via electrical components housed within the handle.

BRIEF DESCRIPTION OF THE DRAWINGS

As mentioned earlier, in one particular application the device is used as a walking aid. In this particular application the device form is the support post of the walking aid with a handle at one end thereof.

Exemplary embodiments will herein after be described with reference to the accompanying drawing, and in those drawings.

DETAILED DESCRIPTION OF SPECIFIC EMBODIMENTS

Figure 1:
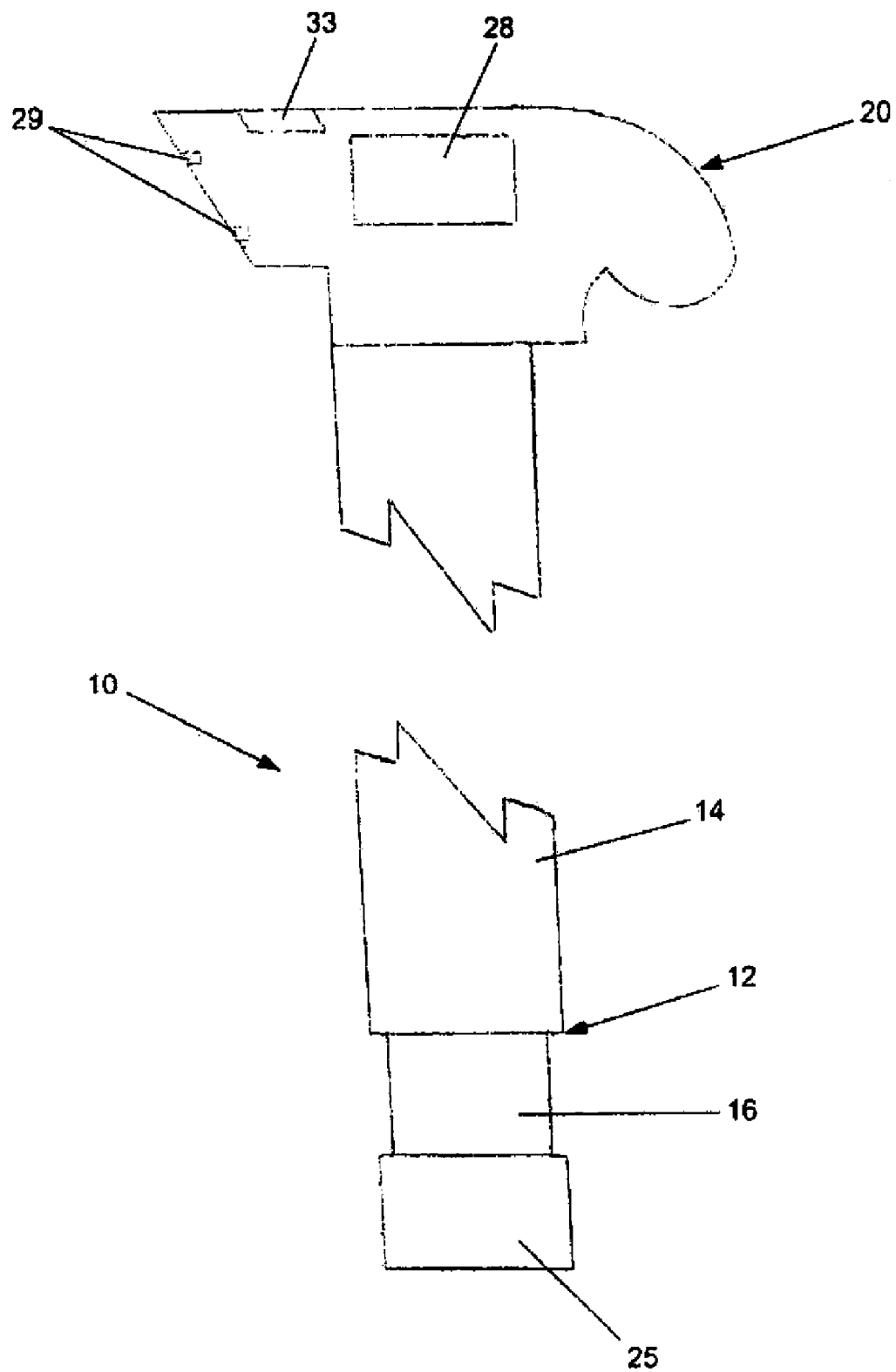
FIG. 1 is a schematic side elevation of the device according to the present invention.

In the figures, incorporated to illustrate features of an example embodiment, like reference numerals are used to identify like parts throughout the figures.

Referring to the drawings there is shown a linearly adjustable device 10 comprising a main body 12 providing a support structure which includes two elongated tubular body sections 14 and 16 which are mounted together in telescopic fashion so that they are capable of sliding movement relative to one another. A coupling ring or collar 18 and an associated split ring (or split olive) 62 is provided between the two body members which provide a bush and seal for the two components.

Figure 3:
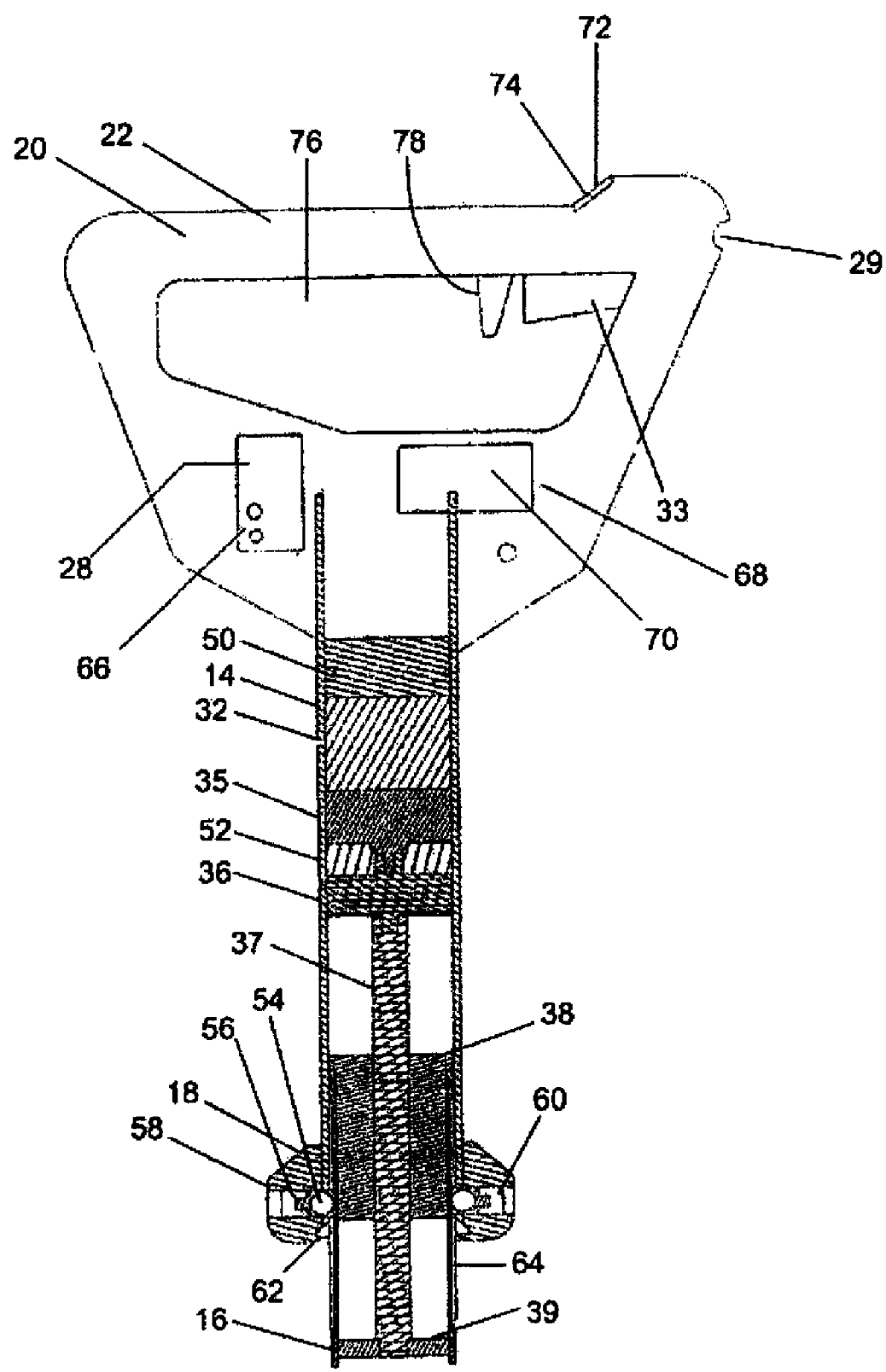
FIG. 3 is a further section side elevation of a further example of the device.

The collar 18 comprises a threaded coupling ring which can be threadably coupled to body section 14 having a corresponding thread. Referring more specifically to FIG. 3 which shows another example of the device 10, the coupling ring 18 includes a split ring 62 which tightens around body section 16 when the coupling ring 18 is screwed onto body section 14. Slots 64 are provided in the outer surface of member 16 which run substantially parallel to the longitudinal axis of the members 14, 16. The coupling includes a plurality of biased members in the form of balls 54 which are mounted within apertures in the coupling ring 18. The balls 54 are biased and are biased radially inward toward the longitudinal axis of the members 14, 16, wherein the slots 64 are adapted to receive a portion of the biased balls 54 therein.

The balls 54 may be biased by a bias element in the form of a spring 60 housed within the apertures which urge against the ball 54, via wear members 56, into the respective slot 64. Grub screws 58 retain the components of the coupling ring 18 together. Due to the balls 54 being biased into engagement with the slot 64, rotational movement of the member 16 relative to member 14 is restricted. The split ring 62 provides additional guidance to the member 16 as it being extended and withdrawn from the member 14. It will be appreciated that as the members 14 and 16 move relative to each other, the balls 54 are able to rotate within the slots 64 whilst restricting rotational movement of the members relative to each other. It will be appreciated that in other applications, rotational movement between members 14, 16 is required, such as an extendable screwdriver, and thus the above-mentioned arrangement may be optional for particular applications where rotational movement is required.

At one end of one of the body sections 14 there is a handle 20 and at the remote end of the other body section 16 there is a rubber boot 25. The handle 20 is hollow and includes a socket section adapted to receive an end of body section 14 therein.

The device 10 further includes a linear actuator 30 which includes a drive motor 32, which may be in the form of a standard reversible motor, a gear train 35 which may be in form of an in-line planetary gear mechanism, clutch 36 and cooperating threaded members 37 and 38. It will be appreciated that the motor can be brushed or brushless. It will also be appreciated that the motor 32 can be AC or DC. The drive motor 32 may be supported by motor bracket 52 as shown in FIG. 3. Threaded member 37 is in the form of an elongated rod having a thread thereon which is of an acme thread form. The other threaded member 38 is in the form of a block, such as a spindle bush 38, which fits into the end of body section 16. A pin (not shown) may be positioned within aperture 31 and 33 which is receivable within a groove or channel body section 16 thereby inhibiting relative rotation between the parts. The pin may be threadably received within apertures 31 and 33. Stop 39 is fitted to the end of the rod 37. As shown the motor 32, gear train 35 and clutch 36 are mounted within tubular body section 14 with threaded member 37 extending in the axial direction.

Figure 2:
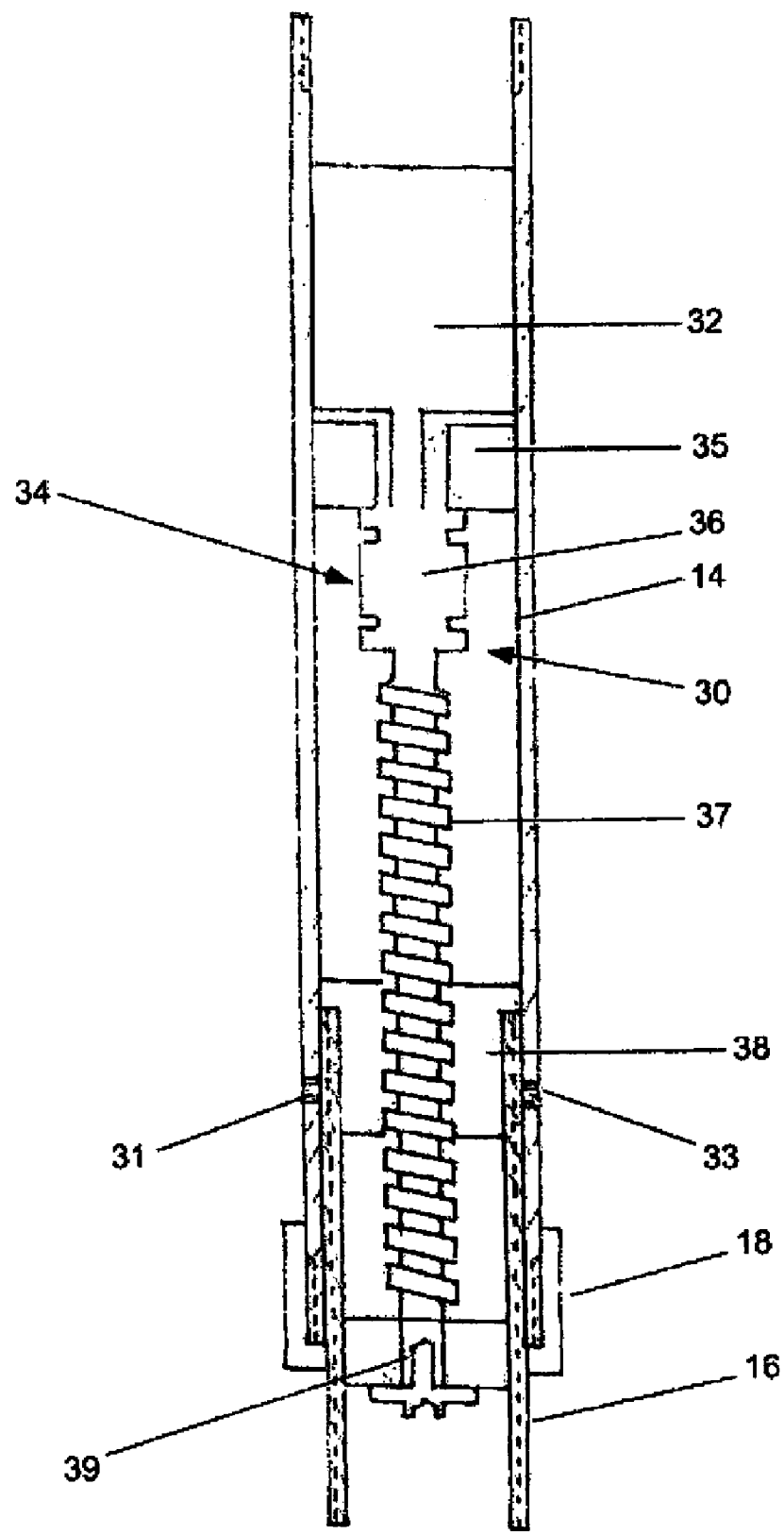
FIG. 2 is a sectional side elevation of part of the device shown in FIG. 1.

As can be seen from FIGS. 2 and 3, the drive motor 32, the gear train 35 and the threaded members 37, 38 are coaxial such that these components are inline. The coaxial design of these components overcomes significant disadvantages over other types of linear actuators which are heavy, large and cumbersome.

A power source in the form of a rechargeable battery pack 28 is mounted within the handle 20 and an actuating switch 33 causes activation of the motor 32 and thereby the threaded rod 37. The handle 20 of the device 10 may include, as shown in FIG. 3, a port 66 for receiving an electrical connection to an external power source (not shown). The port 66 is electrically coupled to the battery pack 28 to thereby allow for the battery pack 28 to be recharged.

LED lights 29 are provided at one end of the handle 20 which when activated provides a light source for the region around the remote end of the main body.

Referring more specifically to FIG. 3, there is shown a more detailed cross-section of the handle 20 of the device 10. The handle 20 includes a cavity for securing therein one of the ends of member 14. The handle 20 also includes an aperture for allowing a user's fingers to wrap around a laterally extending member 22. The handle may be provided in the form of a protective shell which houses therein electrical components. The handle 20 houses therein the battery pack 28.

The handle 20 also includes a plurality of actuating switches. The handle 20 includes a first actuator switch 72 for enabling and disabling power provided to the device 10. The handle 20 also includes a second actuator switch 74 for selecting whether the member 16 is to be extended or retracted relative to member 14. The actuator switches 72, 74 are located at an end of the handle 20 which allows for the user's thumb to actuate the relative switches easily during use. The handle 20 additionally includes a third switch actuator 33 in the form of a trigger which is actuable to extend or retract the member 16 relative to the member 14. The user is able to control the speed which the member 16 is extended or retracted relative to member 14 via the depth which the trigger is actuated. For example, if the trigger 33 is slightly actuated, the member 16 may move slowly relative to member 14 compared to when the trigger 33 is fully actuated by the user resulting in the member 14 extending or retracting at a greater speed. The handle 20 also includes a protruding member 78 which into the aperture 76 from the laterally extending member of the handle 20 to define a barrier between a user fingertips for operating the trigger 33 and gripping the handle 20. An additional fourth actuator switch may be provided on the handle 20 to actuate the operation of the light emitting diodes 29. As will be appreciated, the plurality of actuator switches are in electrical communication with the battery pack 28.

The handle 20 can additionally house an electronic control unit 68 which can be provided in the form of a processor. The control unit 68 has a size substantially similar to a PCMIA cardbus. Additionally, the handle 20 may house additional electronics 70 for providing additional functionality. The control unit 68 can be operatively coupled to the battery pack 28 and one or more of the plurality of actuator switches such that the control unit 68 can receive input, via the actuator switches, in order to control the movement of the members 14, 16.

In one form, the control unit 68 may include memory for storing thereon processor executable instructions. The memory is in electrical communication with the processor for reading and/or writing data therefrom and thereto. The control unit may also include a removable storage interface for receiving a removable storage medium, wherein the removable storage medium stores thereon or therein processor executable instructions. The removable storage interface is in electrical communication with the processor to allow data to be read and/or stored from and to the removable storage medium. When a removable storage medium is received in the removable storage interface, the processor is in electrical communication with the removable storage medium via the removable storage interface. The processor of the control unit can execute the processor executable instructions stored in memory and/or from the removable storage medium in order to control various aspects of the device. For example, the processor executable instructions may define properties, such as the maximum speed that the thread arrangement is able to move. It will be appreciated that the functionality of components operatively coupled to the control unit may be altered via customisation of the processor executable instruction which are executed by the processor of the control unit.

The control unit 68 can be in electrical communication with an encoder unit 50 which is housed within member 14. The encoder 50 is operatively coupled to the motor 32 and counts the number of rotations of the acme spindle 37 when the motor 32 is actuated. The encoder 50 is used by the device 10 to accurately control the amount of rotation applied to the acme spindle 37 by the motor 32 due to input from the user via the actuator switches.

In operation the user can grip the handle 20 and in the particular application described, the device 10 can be used as a walking aid. Activation of the switch 33 will cause rotation of threaded member 37 and its relative rotation to threaded member 38 will cause extension or retraction of the overall length of the main body 12 depending on which position the switch 33 adopts.

The invention provides in this application a walking aid which can be automatically extended or retracted by the user and provide sufficient force during extension to assist the user who may require more support when using to stand from a sitting or lying position. This is particularly important for persons suffering from disabilities such as osteoarthritis of the legs. The device 10 also provides for constant grounding under load during extensions and retractions. The invention also overcomes limitations for users in situations such as on stairs, sidewalk curbs or other unlevel ground situations.

It will be appreciated that the handle 20 and the body section 12 of the device 10 may be separable, and thus the body section 12 of the device 20 may be used for various other applications which require some form of extendable and retractable member. It will be appreciated that the handle 20 can be independent of the mechanical mechanism 12.

The invention has been described with reference to its use as a walking aid. However, it will be appreciated that other applications exist for use of the device 10.

For example it may be suitable for use as a hand held adjustable arm which could be adapted for use as a probe, caulking gun, animal inseminator, periscope or a carriage for tools or other articles.

In another application, the device 10 may assist a user to be able to rise, descend, climb, stand, and/or walk. In other applications, the device 10 may be useful as a personal assistive medical device, an automatically controlled walking cane, a bionic extender tool having a hook-like element for coupling an object for scaling, a power drill including a variable reach, a power driver with a variable reach, a power hammer drill, a gyprock lifter gun/fixer, a drain cover lifter, a linear extender for an electric pruner, cutter or saw device, emergency "man-jack" for particular occupations such as police, firemen and rescue teams, hand-held jack, and/or a hand-held linear actuator. It will be appreciated that the attachment means at the end of member 16 can be used to attach a bionic extender attachment for allowing multiple attachments to be interchanged for differing tasks.

As discussed, the handle 20 may includes various other forms of electronics and circuitry. To this end the handle 20 may house a mobile phone, a GPS navigation unit, a broadband transmitter and receiver (2G/3G), a Bluetooth transmitter and receiver, an audio propter including external speakers to emit the audio prompt, an audio recorder, electronic memory for storing data such as music which can be played, one or more lights in the form of a flashlight, a digital camera, radio, sonar or other location geophysical detecting means, one or more security warning devices, a remote control device, a ground, terrain or depth sensing device, underground radar or detector sensing device, a purse, and/or an emergency position-indicating radio beacon (EPIRB). In another form, the handle may include a pedometer, such as a ball pedometer "mouse" element which is operatively connected to a GPS unit to allow for automated navigation.

It will also be appreciated that as the device 10 provides a drive or transmission linear dual-pipe device which extends or retracts from the body section under constant or variable speed, the device 10 may have other additional applications. For example, the device 10 can operate as an electronically actuated jack due to the ability to shift a constant load to and fro in a linear or planar direction. It will be appreciated that the linear actuator may be controlled via a tactile or radio-controlled remote control. Similar application also exist in other similar fields, wherein the device may be used as a scaffold riser or prop mechanism, a linear actuator (for example as a useful alternative to hydraulic struts, linear mechanical worm drives, ball screw drives), linear drive sources for any complex mechanical device (eg. a chair, bed, etc), an in-situ "built in" vehicular jack which can be actuated via switches located within the vehicle to acuate the jack between an extended and retracted position, a key wherein the device can be used to extend the ridged member of the key into a keyhole for actuating the lock, a drain or pipe cleaning device, a veterinary device for insemination etc., and/or a pump device.

Finally, it is to be understood that various alterations, modifications and/or additions may be incorporated into the various constructions and arrangements of parts without departing from the spirit or ambit of the invention.

The claims defining the invention are as follows:

1. A linearly adjustable device, the device comprising:
    a main body including at least two body sections each having a longitudinal axis, said sections being operatively connected together for linear movement relative to one another in the axial direction;
    a linear actuator operatively mounted to the main body for causing the relative axial movement between the body sections, the linear actuator including a drive and a power transmission mechanism operatively connected to the drive, the transmission mechanism including an elongated threaded member operatively connected to one of the body sections and a cooperating threaded member operatively connected to another of the body sections such that relative rotation between the elongated threaded member and the cooperating threaded member causes relative movement of the body sections; and
    a coupling ring releasably coupled to one of the body sections, the coupling ring including one or more biased balls which cooperate with a corresponding one or more longitudinally extending slots provided in the other body section for restricting relative rotation therebetween.

2. A device according to claim 1 wherein the main body sections are operatively connected together in telescopic fashion.

3. A device according to claim 1 wherein the body sections are at least partly tubular members.

4. A device according to claim 3 wherein the at least partly tubular members are generally circular in cross section.

5. A device according to claim 1, wherein the elongated threaded member is mounted within one of the body sections and extends generally in the axial direction into the other body section, the threaded member being operatively connected to the drive for rotation thereby.

6. A device according to claim 5 wherein the cooperating threaded member is in the form of a block operatively connected to another body section and having a threaded aperture therein which cooperates with the elongated threaded member so that rotation of the elongated threaded member causes relative movement between the two members.

7. A device according to claims 5 wherein the thread on the elongated threaded member is an acme type thread.

8. A device according to claim 1, wherein the one or more biased balls are biased by a biasing element to cause the one or more biased balls to cooperate with the corresponding one or more longitudinally extending slots.

9. A device according to claim 1, wherein the drive is in the form of a motor mounted within one of the parts of the main body and is operatively connected to the threaded member.

10. A device according to claim 9 wherein the drive motor is connected to the threaded member via a clutch.

11. A device according to claim 10 further including a stop at an end of the threaded member remote from the drive which limits relative linear movement between the two members.

12. A device according to claim 1 further including a handle at one end of the main body.

13. A device according to claim 12 further including an actuating switch on the handle which can activate and deactivate the drive.

14. A device according to claim 13, wherein the actuating switch is a variable actuator, wherein variable actuation of the variable actuator controls a speed of the drive.

15. A device according to claim 14 including an electronic control unit in electrical communication with the drive, the variable actuator, and an encoder operatively coupled to the drive to sense a number of rotations applied to the elongated threaded member by the drive, wherein the electronic control unit is configured to:
    receive an electronic signal from the encoder indicative of the number of rotations, and
    control the drive based upon the number of rotations and the variable actuation of the variable actuator.

16. A device according to claim 13, wherein the handle includes a casing defining a cavity therein which houses electrical components operatively connected to the drive.

17. A device according to claim 16, wherein the handle includes one or more light emitting diodes arranged to illuminate a region adjacent an end of the device remote from the handle.

18. A device according to claim 1, wherein the drive is coaxial with the threaded member.

19. A device according to claim 1, wherein the device is a walking aid.

20. A device according to claim 1, wherein the coupling ring includes a threaded section and a portion of an outer surface of one of the body sections has a cooperating threaded portion, wherein the threaded section of the coupling ring engages the threaded portion of the respective body section in order to releasably couple the coupling ring to the respective body section.

21. A device according to claim 20, wherein the coupling ring includes a split ring which tightens about the other body section when the coupling ring is releasably coupled in order to guide relative movement between the body sections.

* * * * *